No. 826,790.
PATENTED JULY 24, 1906.
O. M. LISSAK.
HOLDER FOR CHEESES.
APPLICATION FILED JAN. 26, 1906.
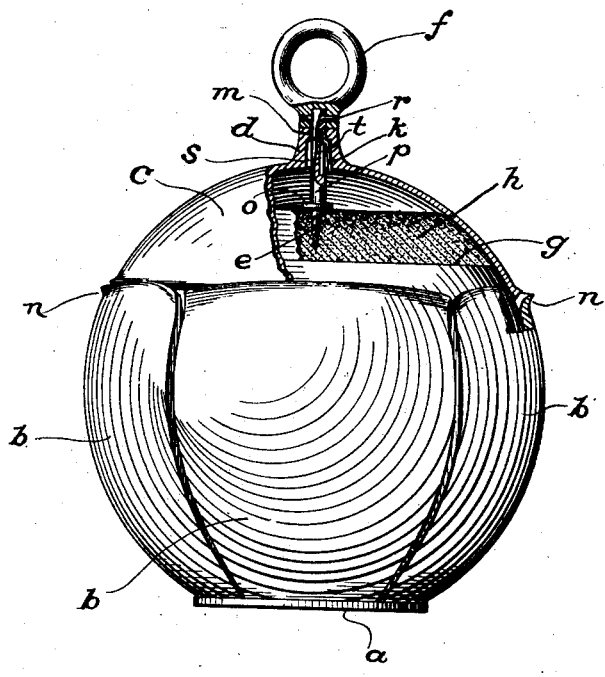
WITNESSES:
INVENTOR
BY
ATTORNEYS.
THE NORRIS PETERS CO., WASHINGTON, D. C.

UNITED STATES PATENT OFFICE.

ORMOND M. LISSAK, OF WEST POINT, NEW YORK.

HOLDER FOR CHEESES.

No. 826,790.  Specification of Letters Patent.  Patented July 24, 1906.

Application filed January 26, 1906. Serial No. 297,931.

*To all whom it may concern:*

Be it known that I, ORMOND M. LISSAK, a citizen of the United States, residing at West Point, county of Orange, and State of New York, have invented a new and useful Improvement in Holders for Cheeses, of which the following is a full, clear, and exact description, reference being had to the accompanying drawing, which forms a part of this specification.

The object of my invention is the production of an ornamental and useful covering or inclosure particularly adapted for cheeses; but it may be applied to any other object of similar character.

I will first describe the embodiment of my invention as disclosed in the accompanying drawing, which shows my improved holder in elevation, the cover and edge of body being partially in section.

The holder is formed of two parts, the lower portion forming the receptacle surrounding and securing the cheese, while the upper part forms the cover. The lower part is formed of a circular base $a$, to which are secured the leaves $b$. These leaves are formed of resilient metal and may be secured to the base $a$ in any desired manner. As shown, they are formed in one piece with the base. The leaves $b$ are shaped to conform to the usual shape and dimensions of the cheese and are of sufficient length to extend above the greatest diameter of the cheese. The precise number of leaves $b$ is not essential. Six are used in the specific device shown. The leaves $b$ are separated one from the other throughout their length, and the spring of the metal of which they are constructed allows them to separate from each other to allow the cheese to be inserted. On the insertion of the cheese the leaves return, embracing the cheese and holding it securely. To assist in the insertion of the cheese and the proper placing of the cover, the top of the leaves are bent or turned over outward, as shown at $n$. This also adds to the appearance of the holder.

The cover consists of the hollow spherical segment $c$, to which is secured or attached the lug $d$, bored as shown at $m$. $e$ is a screw of the type of the ordinary wood-screw or of the cork-screw type. Above this is the collar or flange $o$ on shank $p$. The shank $p$ enters the bore $m$ of lug $d$ and is connected by bin $r$ to finger-ring $f$. The lug $d$ is counterbored at $s$ to receive the collar or flange $o$. The cheese is previously cut on the line $g$, so that the portion of cheese between $g$ and $h$ is free from the body of the cheese, but rests thereon. The cheese, with the portion between $g$ and $h$, is inserted in the body by pressing outward the leaves $b$, which, as before described, spring back, embracing and holding the cheese. The cover is then placed upon the cheese. This cover is of such length that its lower edge extends just within the tops of the lower leaves, so that when the cover is in place the only portion of the cheese exposed to view is seen through the narrow openings between the leaves $b$. The ring $f$ is turned to cause the screw $e$ to enter the top portion of the cheese. When it is desired to use the cheese, by lifting the ring $f$ both the cover and the top portion of the cheese are removed, leaving the cut surface of the cheese exposed and convenient for serving.

While the screw $e$ will practically form a connection between the ring $f$ and cover sufficient to lift the cover with the top of cheese, if desired, the following supplemental device may be used: $k$ is a fine spring. This spring is connected with the shank of screw $e$ by lying in a slot $t$. This spring is offset, and the offset portion is in the counterbore $s$. When the ring $f$ is down, the upper end of this offset portion is just beneath the shoulder at the lower end of bore $m$.

I have in the drawings shown the holder of the shape for use with a cheese made in the usual form of the well-known Edam cheese. My invention, however, is equally applicable to pineapple or other cheese, the precise shape of the holder not being an essential of my invention.

Having now fully described my invention, what I claim, and desire to protect by Letters Patent, is—

1. A holder for cheese or other articles, comprising a body adapted to receive the article, a cover adapted to coact with said body, said cover carrying a device adapted to enter and connect the upper portion of the article with the cover.

2. A holder comprising a body having a base, leaves extending vertically from said base, said leaves being separated from each other throughout their length and having their upper portions bent outward, and a cover adapted to coact with said body and of length sufficient to extend below the bent-over portion of the leaves, said cover carrying a device adapted to enter and connect the upper portion of the article with the cover.

3. A holder for cheese, comprising in combination, a body portion, a cover, a screw, the shank of which extends through said cover, and a holding device beyond said cover to which said shank is connected, and means to limit the vertical movement of said screw.

4. A holder for cheese comprising in combination a cover, a screw, the shank of which extends through said cover, said cover having a lug on its exterior, there being a bore in said lug, the shank of the screw extending through said bore, and a holding device exterior of the cover and above said lug to which said shank is secured, and means to limit the vertical movement of said screw.

5. A holder for cheese, comprising in combination, a cover, a screw, the shank of which extends through said cover and a holding device beyond said cover to which said shank is connected, means to limit the vertical movement of said screw, and connection between said screw and cover.

6. A holder for cheese comprising in combination a cover, a screw, the shank of which extends through said cover, said cover having a lug on its exterior, there being a bore in said lug, the shank of said screw extending through said bore, a holding device exterior of the cover and above said lug to which said shank is secured, means to limit the vertical movement of said screw and connection between said screw and cover.

7. A holder for cheese comprising in combination a cover, a screw, the shank of which extends through said cover, said cover having a lug on its exterior, there being a bore in said lug, the shank of said screw extending through said bore, a holding device exterior of the cover and above said lug to which said shank is secured, there being a counterbore in said lug, and a spring in said counterbore and connected to said screw.

In testimony of which invention I have hereunto set my hand, at West Point, New York, on this 23d day of January, 1906.

ORMOND M. LISSAK.

Witnesses:
F. W. COE,
WM. WARD.